United States Patent
Manolakos et al.

(10) Patent No.: US 10,454,644 B2
(45) Date of Patent: Oct. 22, 2019

(54) TECHNIQUES FOR MULTI-CLUSTER UPLINK TRANSMISSIONS

(71) Applicant: QUALCOMM Incorporated, San Diego, CA (US)

(72) Inventors: Alexandros Manolakos, San Diego, CA (US); Joseph Binamira Soriaga, San Diego, CA (US); Hao Xu, Beijing (CN); Wanshi Chen, San Diego, CA (US); Tingfang Ji, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/933,068

(22) Filed: Mar. 22, 2018

(65) Prior Publication Data
US 2018/0278384 A1 Sep. 27, 2018

Related U.S. Application Data

(60) Provisional application No. 62/476,356, filed on Mar. 24, 2017.

(51) Int. Cl.
H04L 5/00 (2006.01)
H04W 72/04 (2009.01)
H04L 1/00 (2006.01)
H04L 25/02 (2006.01)

(52) U.S. Cl.
CPC .......... H04L 5/005 (2013.01); H04L 1/0013 (2013.01); H04L 5/0044 (2013.01); H04L 5/0048 (2013.01); H04L 5/0051 (2013.01); H04L 5/0053 (2013.01); H04L 25/0224 (2013.01); H04W 72/044 (2013.01); H04L 5/0005 (2013.01); H04L 5/0007 (2013.01); H04L 5/0041 (2013.01)

(58) Field of Classification Search
None
See application file for complete search history.

(56) References Cited

U.S. PATENT DOCUMENTS 9,025,684 B2 * 5/2015 Jeong .................... H04L 5/0007 375/260
2009/0274226 A1 11/2009 Mondal et al.
2011/0085513 A1 * 4/2011 Chen .................... H04W 72/042 370/330

(Continued)

OTHER PUBLICATIONS

International Search Report and Written Opinion—PCT/US2018/024170—ISA/EPO—dated Aug. 22, 2018 22 pages.

(Continued)

Primary Examiner — Otis L Thompson, Jr.
(74) Attorney, Agent, or Firm — Arent Fox LLP

(57) ABSTRACT

Various aspects described herein relate to techniques for multi-cluster uplink transmissions in wireless communications systems. A method, a computer-readable medium, and an apparatus are provided. In an aspect, the method comprises receiving, by a user equipment (UE), information of one or more sounding reference signal (SRS) patterns, generating, by the UE, one or more rate matching parameters based on the information, and transmitting, by the UE, an uplink signal based on the generated one or more rate matching parameters.

30 Claims, 10 Drawing Sheets

(56) References Cited

U.S. PATENT DOCUMENTS

| | | | |
|---|---|---|---|
| 2012/0243496 A1* | 9/2012 | Zhu | H04W 74/002 370/329 |
| 2012/0257584 A1 | 10/2012 | Behravan et al. | |
| 2012/0307779 A1* | 12/2012 | Noh | H04B 7/155 370/329 |
| 2013/0142160 A1* | 6/2013 | Hoshino | H04L 1/1861 370/329 |
| 2013/0148592 A1* | 6/2013 | Noh | H04W 72/12 370/329 |
| 2013/0336226 A1* | 12/2013 | Noh | H04L 1/0026 370/328 |
| 2014/0321313 A1* | 10/2014 | Seo | H04J 11/00 370/252 |
| 2016/0295526 A1* | 10/2016 | Park | H04W 52/325 |
| 2017/0201989 A1* | 7/2017 | Fakoorian | H04L 5/0048 |
| 2017/0310439 A1* | 10/2017 | Yang | H04L 5/0032 |
| 2017/0332370 A1* | 11/2017 | Rico Alvarino | H04L 5/0048 |
| 2018/0048498 A1* | 2/2018 | Stern-Berkowitz | H04L 5/0048 |
| 2018/0316452 A1* | 11/2018 | Chen | H04W 16/02 |
| 2018/0368138 A1* | 12/2018 | Jung | H04W 72/0413 |

OTHER PUBLICATIONS

LG Electronics: "Discussion on UL Channel Multiplexing in NR," 3GPP Draft, R1-1702484 Discussion on UL Channel Multiplexing in NR, 3rd Generation Partnership Project (3GPP), Mobile Competence Centre, 650, Route Des Lucioles, F-06921 Sophia-Antipolis Cedex, Fra, Vol, RAN WGI, No, Athens, Greece, 20170213-20170217, Feb. 12, 2017 (Feb. 12, 2017), XP051209638, 6 Pages, Retrieved from the Internet: URL:http://www.3gpp.org/ftp/Meetings_3GPP_SYNC/RAN1/Docs/ [retrieved on Feb. 12, 2017].

Partial International Search Report—PCT/US2018/024170—ISA/EPO—Jun. 27, 2018 17 pages.

RAN1: "LS for SRS Carrier-Based Switching Agreements," 3GPP Draft, R4-1700410_R1-1613481, 3rd Generation Partnership Project (3GPP), Mobile Competence Centre, 650, Route Des Lucioles, F-06921 Sophia-Antipolis Cedex, France, Vol, RAN WG4, No, Athens, Greece, 20170213-20170217, Feb. 12, 2017 (Feb. 12, 2017), XP05I213597, 3 Pages, Retrieved from the Internet: URL:http://www.3gpp.org/ftp/Meetings_3GPP_SYNC/RAN4/Docs/ [retrieved on Feb. 12, 2017].

* cited by examiner

TECHNIQUES FOR MULTI-CLUSTER UPLINK TRANSMISSIONS

CROSS-REFERENCE TO RELATED APPLICATION

This application claims the benefit of U.S. Provisional Application Ser. No. 62/476,356, entitled "TECHNIQUES FOR MULTI-CLUSTER UPLINK TRANSMISSIONS" and filed on Mar. 24, 2017, which is expressly incorporated by reference herein in its entirety.

BACKGROUND

Aspects of the present disclosure relate generally to wireless communications systems, and more particularly, to techniques for multi-cluster uplink transmissions with sounding reference signals (SRS) in wireless communications systems (e.g., 5G New Radio).

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, higher spectral efficiency, and better cell coverage, new or improved approaches may be desirable to enhance multi-symbol uplink transmissions and/or multi-cluster uplink transmissions (e.g., SRS transmissions), in order to satisfy consumer demand and improve user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to uplink transmissions in a wireless communications system is provided. The method includes receiving, by a user equipment (UE), information of one or more sounding reference signal (SRS) patterns, generating, by the UE, one or more rate matching parameters based on the information, and transmitting, by the UE, an uplink signal based on the generated one or more rate matching parameters.

In an aspect, an apparatus for wireless communications is provided that includes a receiver, a transmitter, a memory configured to store instructions, and at least one processor communicatively coupled with the receiver, the transmitter and the memory. In an example, the at least one processor is configured to execute the instructions to receive, via the receiver, information of one or more SRS patterns, generate one or more rate matching parameters based on the information, and transmit, via the transmitter, an uplink signal based on the generated one or more rate matching parameters.

In another aspect, an apparatus for wireless communications is provided that includes means for receiving information of one or more SRS patterns, means for generating one or more rate matching parameters based on the information, and means for transmitting an uplink signal based on the generated one or more rate matching parameters.

In yet another aspect, a computer-readable medium (e.g., a non-transitory computer-readable medium) storing computer code executable by at least one processor for managing uplink transmissions in wireless communications is provided. The computer-readable medium may include code for receiving information of one or more SRS patterns, code for generating one or more rate matching parameters based on the information, and code for transmitting an uplink signal based on the generated one or more rate matching parameters.

According to another example, a method related to uplink transmissions in a wireless communications system is provided. In an aspect, the method includes receiving, by a UE, one or more rate matching parameters, determining, by the UE, that the UE is not scheduled to transmit uplink signals in one or more SRS resources based on the received one or more rate matching parameters, and transmitting, by the UE, an uplink signal based on the determination.

In another aspect, an apparatus for wireless communications is provided that includes a receiver, a transmitter, a memory configured to store instructions, and at least one processor communicatively coupled with the receiver, the transmitter and the memory. In an example, the at least one processor is configured to execute the instructions to receive, via the receiver, one or more rate matching parameters, determine that the apparatus is not scheduled to transmit uplink signals in one or more SRS resources based on the received one or more rate matching parameters, and transmit, via the transmitter, an uplink signal based on the determination.

In yet another aspect, an apparatus for wireless communications is provided that includes means for receiving one or more rate matching parameters, means for determining that the apparatus is not scheduled to transmit uplink signals in one or more SRS resources based on the received one or more rate matching parameters, and means for transmitting an uplink signal based on the determination.

In a further aspect, a computer-readable medium (e.g., a non-transitory computer-readable medium) storing computer code executable by at least one processor for managing uplink transmissions in wireless communications is provided. The computer-readable medium may include code for receiving one or more rate matching parameters, code for determining that a UE is not scheduled to transmit uplink signals in one or more SRS resources based on the received one or more rate matching parameters, and code for transmitting an uplink signal based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
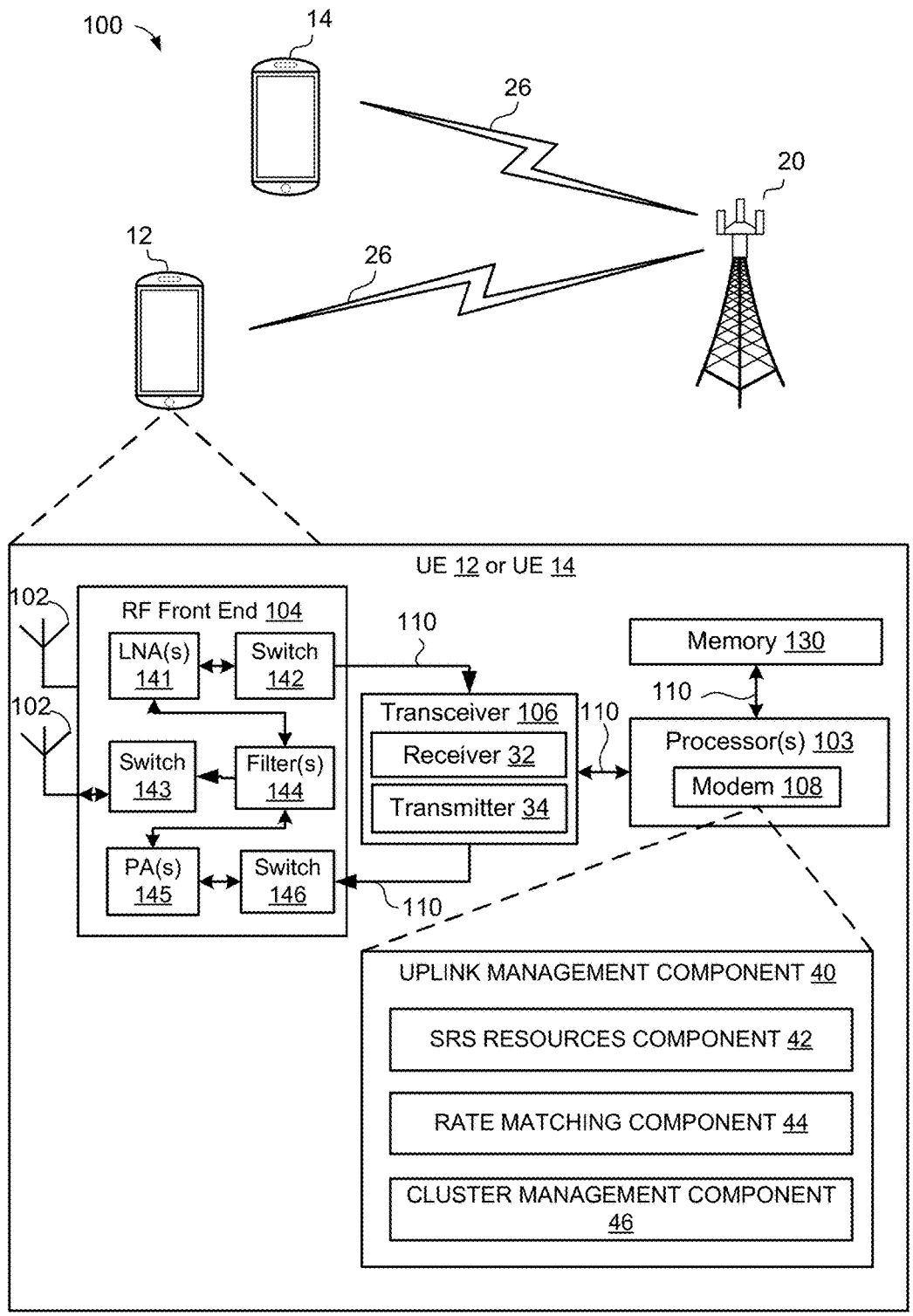
FIG. 1 is a block diagram of an example communications network including at least one network entity in communication with one or more user equipment (UE) configured to perform uplink (UL) transmissions, according to one or more of the presently described aspects.

In the 5th Generation (5G) New Radio (NR) communications, multi-symbol sounding reference signals (SRS) may be supported or used in uplink (UL) transmissions. In an aspect, when multi-symbol SRS transmissions are used in an UL signal, UL assignment(s) (e.g., Physical Uplink Shared Channel (PUSCH) or Physical Uplink Control Channel (PUCCH)) for a user equipment (UE) in the uplink signal may be colliding with SRS transmissions from one or more other UEs. In some examples, the uplink signal may be a long PUCCH channel, or a short PUCCH channel, or a PUSCH channel with duration from one (1) to fourteen (14) symbols. In some cases, issues of rate matching and/or multi-cluster UL transmissions among the multiple UEs may need to be addressed. In some examples, a long UL signal may include at least 4 orthogonal frequency division multiplexing (OFDM) symbols, and in some implementations, a long UL signal may include 10 or more OFDM symbols.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to a wireless communications system (e.g., a 5G NR system), in particular, techniques for multi-cluster uplink transmissions with multi-symbol SRS. In some aspects, different behaviors from a UE may be expected whenever the UL assignment(s) (e.g., PUSCH or PUCCH) for the UE in a UL signal (e.g., a long UL signal) are colliding with SRS transmissions or resources of other UEs. For example, to avoid multi-cluster UL transmissions, the UE may transmit UL transmissions (e.g., PUSCH/PUCCH) in any situation. In another example, a UE may be configured to rate match or puncture the PUSCH/PUCCH signal(s) to avoid collisions with the scheduled SRS transmissions of other UEs. In yet another example, the UE may be configured to rate match or puncture around all the semi-statically configured SRS transmissions to avoid collisions between the PUSCH/PUCCH signal(s) from the UE and SRS transmissions from other UEs.

In some aspects, SRS are reference signals transmitted on the UL from one or more UEs. In some implementations, at least two use cases that may need to be facilitated with the use of SRS transmissions: exploiting UL-DL reciprocity for downlink (DL) purposes, and performing UL channel sounding for UL purposes. For example, channel reciprocity (e.g., the UL-DL reciprocity) may be used in a time-division duplexing (TDD) network (or a Frequency-division duplexing (FDD) network) for base stations (e.g., eNBs) to obtain DL channel state information from UL SRS transmissions without relying on intensive feedback from UEs. In some conventional wireless communications systems (e.g., an LTE system), only one symbol may be used for UL SRS. In contrast, for example, a 5G NR system may use multiple symbols for UL SRS, and configurable SRS bandwidth is supported. For example, SRS may be configurable with regard to density in frequency domain (e.g., comb levels) and/or in time domain (e.g., multi-symbol SRS transmissions). In an aspect, frequency hopping is supported in 5G NR, at least within a partial-band for a UE where at least hopping with a granularity of sub-band is supported. In some examples, symbol-level hopping may use multiple symbols to be reserved for SRS in a transmission slot.

Each of the aspects described above are performed or implemented in connection with FIGS. 1-10, which are described in more detail below.

Referring to FIG. 1, in an aspect, a wireless communication system 100 includes at least one UE 12 or UE 14 in communication coverage of at least one network entity 20 (e.g., a base station or an eNB, or a cell thereof, in a 5G NR network). UE 12 and/or UE 14 may communicate with a network via the network entity 20. In some aspects, multiple UEs including at least the UE 12 and/or UE 14 may be in communication coverage with one or more network entities, including network entity 20. In an aspect, the network entity 20 may be a base station such an eNodeB/eNB in 5G NR technology network, and/or in a long term evolution (LTE) network. Although various aspects are described in relation to the Universal Mobile Telecommunications System (UMTS), LTE, or 5G NR networks, similar principles may be applied in other wireless wide area networks (WWAN). The wireless network may employ a scheme where multiple UEs may transmit on a channel. In an example, the UE 12 and/or UE 14 may transmit and/or receive wireless communications to and/or from the network entity 20. For example, the UE 12 and/or UE 14 may be actively communicating with the network entity 20.

In some aspects, UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things (IoT), or any other similar functioning device. Additionally, the network entity 20 may be a macrocell, picocell, femtocell, relay, Node B, mobile Node B, small cell box, UE (e.g., communicating in peer-to-peer or ad-hoc mode with the UE 12 and/or UE 14), or substantially any type of component that can communicate with the UE 12 and/or UE 14 to provide wireless network access to the UE 12 and/or UE 14.

According to the present aspects, the UE 12 and/or UE 14 may include one or more processors 103 and a memory 130 that may operate in combination with an uplink management component 40 to control a SRS resources component 42, a rate matching component 44, and/or a cluster management component 46 for performing uplink management and transmissions as described herein.

For example, the uplink management component 40 may be configured to identify information of SRS resources or transmissions from other UEs, rate matching for UL transmissions (e.g., PUSCH/PUCCH), and/or perform multi-cluster management for UL transmissions. In an aspect, the term "component" as used herein may be one of the parts that make up a system, may be hardware, firmware, and/or software, and may be divided into other components. The uplink management component 40 may be communicatively coupled with a transceiver 106, which may include a receiver 32 for receiving and processing RF signals and a transmitter 34 for processing and transmitting RF signals.

In some aspects, the uplink management component 40 may include the SRS resources component 42, the rate matching component 44, and/or the cluster management component 46 for performing uplink management and transmissions. For example, the SRS resources component 42 may be configured to identify or determine the SRS resources or patterns used for SRS transmissions of the UEs. In an example, the rate matching component 44 may be configured to perform a rate matching to avoid UL transmissions from the UE 12 colliding with SRS transmissions from other UEs (e.g., the UE 14). In an example, the cluster management component 46 may be configured to determine the number of clusters used in the UL transmissions, determine, identify, or report the maximum number of clusters the UE can support, and/or adjust (e.g., decrease) the number of clusters the UE may use for UL transmissions. The processor 103 may be communicatively coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium, or non-transitory computer-readable storage medium). The receiver 32 may be, for example, a radio frequency (RF) receiver. In an aspect, the receiver 32 may receive signals transmitted by UE 12 and/or UE 14 or network entity 20. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 can include a modem 108 that uses one or more modem processors. The various functions related to the Uplink management component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the uplink management component 40, including the SRS resources component 42, the rate matching component 44, and/or the cluster management component 46.

The uplink management component 40, SRS resources component 42, rate matching component 44, and/or cluster management component 46 may include hardware, firmware, and/or software code executable by a processor for performing random access management and operations. For example, the hardware may include, for example, a hardware accelerator, or specialized processor.

Moreover, in an aspect, the UE 12 and/or UE 14 may include a RF front end 104 and transceiver 106 for receiving and transmitting radio transmissions, for example, wireless communications 26. For example, transceiver 106 may receive a signal that includes information (e.g., DCI) of the allocated/configured/scheduled SRS resources for the UE 12 and/or other UEs (e.g., the UE 14). Depending on the UE behavior discussed herein, the transceiver 106 may transmit or may not transmit an UL signal to the network entity 20 (e.g., to avoid collisions and/or multi-cluster transmissions). For example, transceiver 106 may communicate with modem 108 to transmit messages generated by the uplink management component 40 and/or to receive messages and forward them to uplink management component 40.

RF front end 104 may be connected to one or more antennas 102 and can include one or more low-noise amplifiers (LNAs) 141, one or more switches 142, 143, 146, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, the LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the uplink management component 40.

Further, for example, one or more PA(s) 145 may be used by the RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 may be used by the RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, RF front end 104 may use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through an antenna 102 via the RF front end 104. In an aspect, the transceiver may be tuned to operate at specified frequencies such that the UE 12 and/or UE 14 can communicate with, for example, the network entity 20. In an aspect, for example, the modem 108 can configure the transceiver 106 to operate at a specified frequency and power level based on the UE configuration of the UE 12 and/or UE 14 and communication protocol used by modem 108.

In an aspect, the modem 108 can be a multiband-multimode modem, which can process digital data and communicate with the transceiver 106 such that the digital data is sent and received using the transceiver 106. In an aspect, the modem 108 can be multiband and be configured to support multiple frequency bands for a specific communications protocol. In an aspect, the modem 108 can be multimode and be configured to support multiple operating networks and communications protocols. In an aspect, the modem 108 can control one or more components of the UE 12 and/or UE 14 or the network entity 20 (e.g., RF front end 104, transceiver 106) to enable transmission and/or reception of signals based on a specified modem configuration. In an aspect, the modem configuration can be based on the mode of the modem and the frequency band in use. In another aspect, the modem configuration can be based on UE configuration information associated with the UE 12 and/or UE 14 as provided by the network during cell selection and/or cell reselection.

The UE 12 and/or UE 14, or the network entity 20 may further include memory 130, such as for storing data used herein and/or local versions of applications or Uplink management component 40 and/or one or more of its subcomponents being executed by processor 103. The memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining the uplink management component 40 and/or one or more of its subcomponents, and/or data associated therewith, when the UE 12 and/or UE 14 is operating the processor 103 to execute the uplink management component 40 and/or one or more of the subcomponents of the uplink management component 40. In another aspect, for example, the memory 130 may be a non-transitory computer-readable storage medium.

Figure 2:
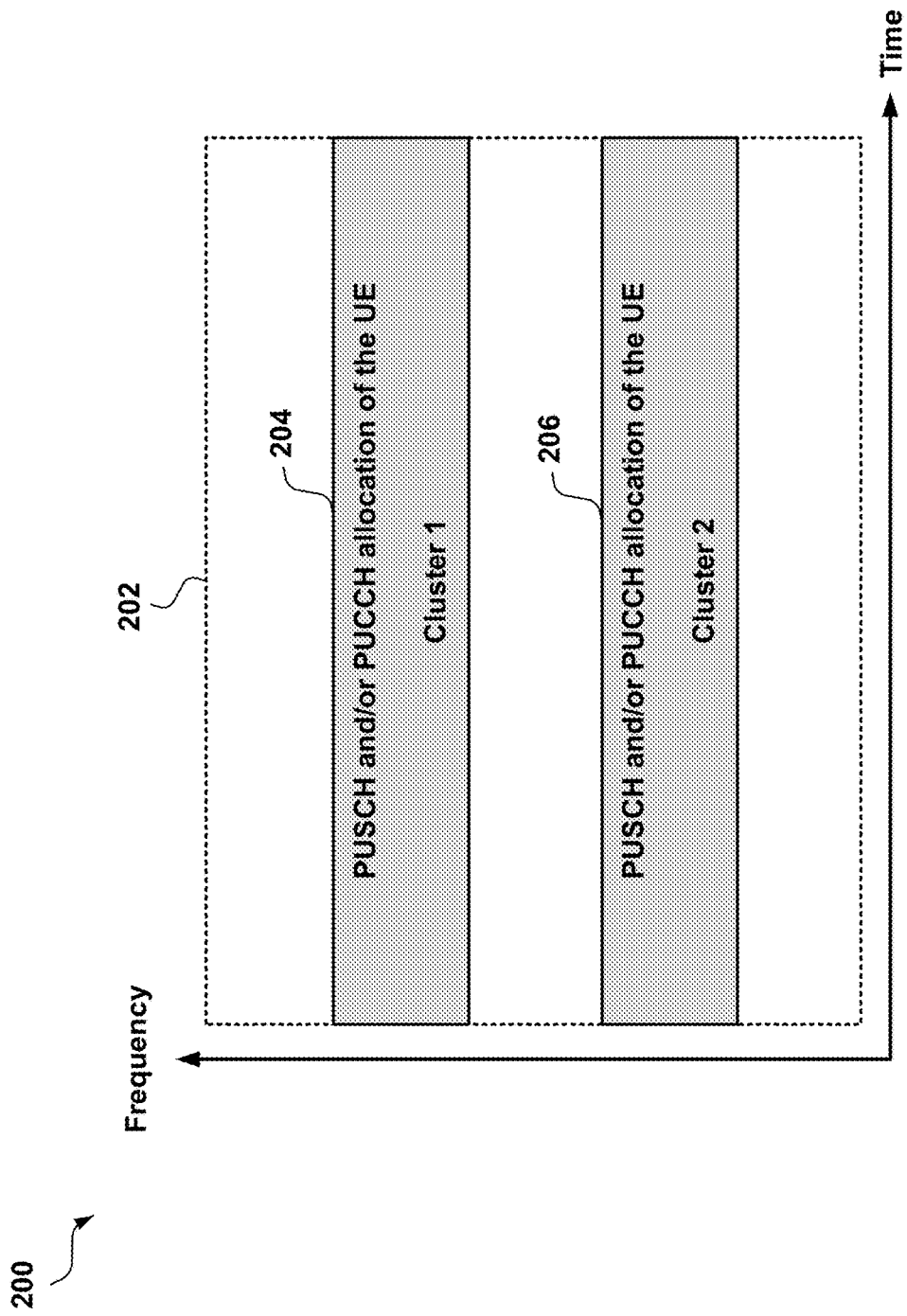
FIG. 2 is an illustration of example resources allocation for UL multi-cluster transmissions of a UE, according to one or more of the presently described aspects.

Referring to FIG. 2, in an aspect, for example, a multi-cluster UL transmission 200 for a UE (e.g., UE 12 or UE 14 in FIG. 1) may occur at different clusters (e.g., different frequency or time resources clusters), for example, cluster 1 and cluster 2, and each cluster has a respective allocation of frequency and/or time (e.g., PUSCH or PUCCH in a resources allocation) within UL resources 202 as shown in FIG. 2. In an example, cluster 1 may include a PUSCH and/or PUCCH allocation 204 for the UE, and cluster 2 may include a PUSCH and/or PUCCH allocation 206 for the UE. In some implementations, the multi-cluster transmission 200 may result in power amplifier (PA) inefficiencies, which may occur when using OFDM with Cyclic Prefix (CP-OFDM) or Discrete Fourier Transform Spread OFDM (DFT-S-OFDM) for UL transmissions (e.g., in a 5G NR system). For example, when a UL waveform uses DFT-S-OFDM, the UL multi-cluster transmission using DFT-S-OFDM may lead to significantly higher cubic metric (CM). Therefore, in some implementations, a UL multi-cluster transmission may be avoided in some conventional wireless communications systems (e.g., an LTE system), and for the same reason, a 5G NR system may also try to avoid a UL multi-cluster transmission.

Figure 3:
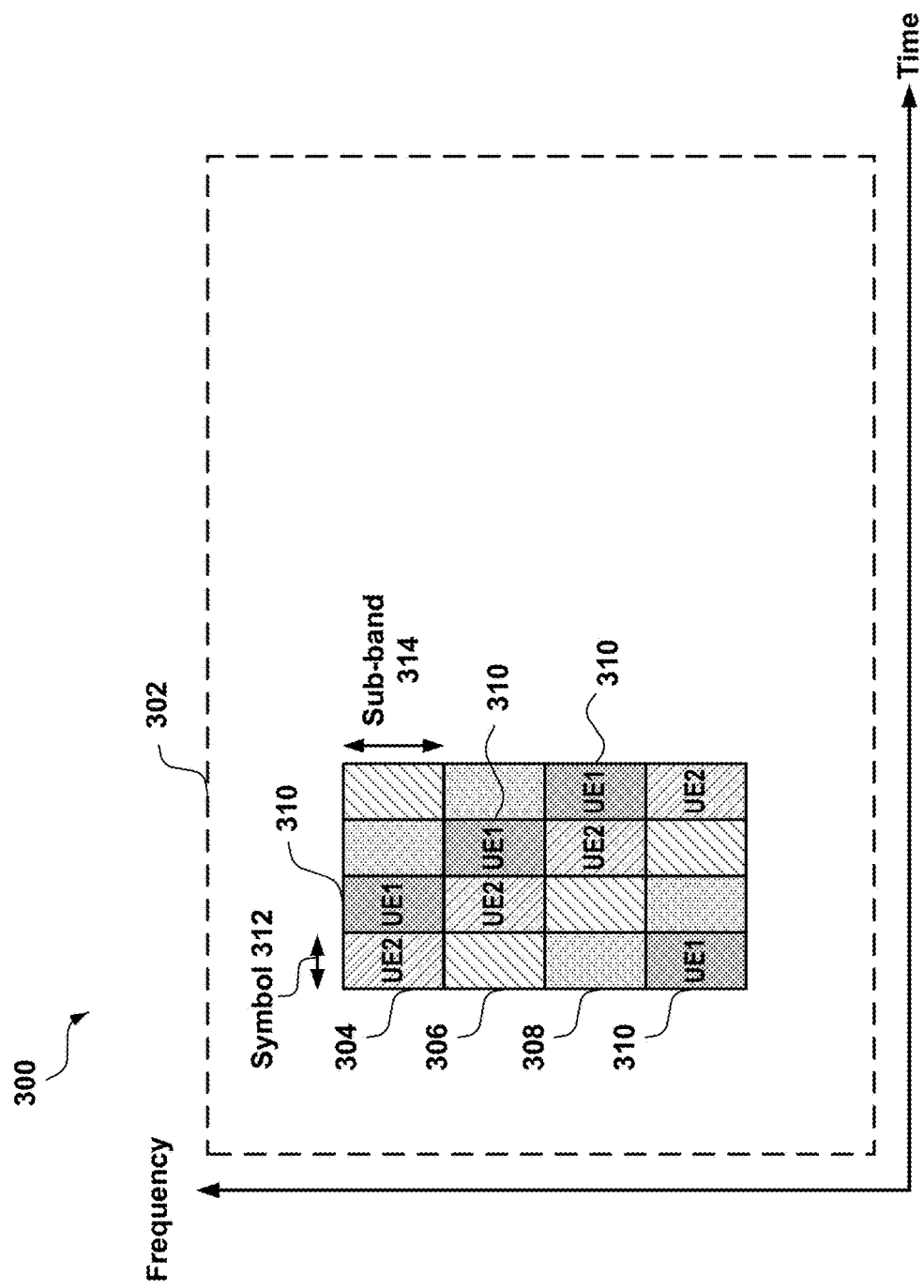
FIG. 3 is an illustration of example resources allocation for multi-symbol sounding reference signals (SRS) with hopping, according to one or more of the presently described aspects.

Referring to FIG. 3, in an aspect of the present disclosure, an example of a multi-symbol SRS scheme 300 with hopping is provided. For example, UL resources 302 may include multiple symbols 312 (e.g., OFDM symbols) in time domain, and multiple sub-bands 314 (e.g., in resource blocks) in frequency domain. Each block (e.g., blocks 304, 306, 308, and 310) represents a resource allocation (e.g., resource allocation for SRS, PUCCH, or PUSCH) for a respective UE (e.g., UE1 or UE2, or UE 12 or UE 14 in FIG. 1), and the UE may use the allocated or scheduled sub-bands and/or OFDM symbols to transmit one or more SRSs. In some examples, SRS hopping may be performed in time domain (e.g., hopping from an OFDM symbol to a different OFDM symbol), and/or in frequency domain (e.g., hopping from an OFDM sub-band to a different OFDM sub-band). In an aspect, UE1 may hop multiple blocks to transmit one or more SRSs. For example, UE1 may transmit one or more SRSs at the blocks 310 (e.g., at the frequency(s) and time(s) indicated by blocks having a "UE1" label). In some cases, in time domain, the SRS of UE1 may hop from the second symbol on the left to the third symbol on the right, and in frequency domain, the SRS of UE1 may hop from the first sub-band on the top to the fourth sub-band at the bottom.

Figure 4:
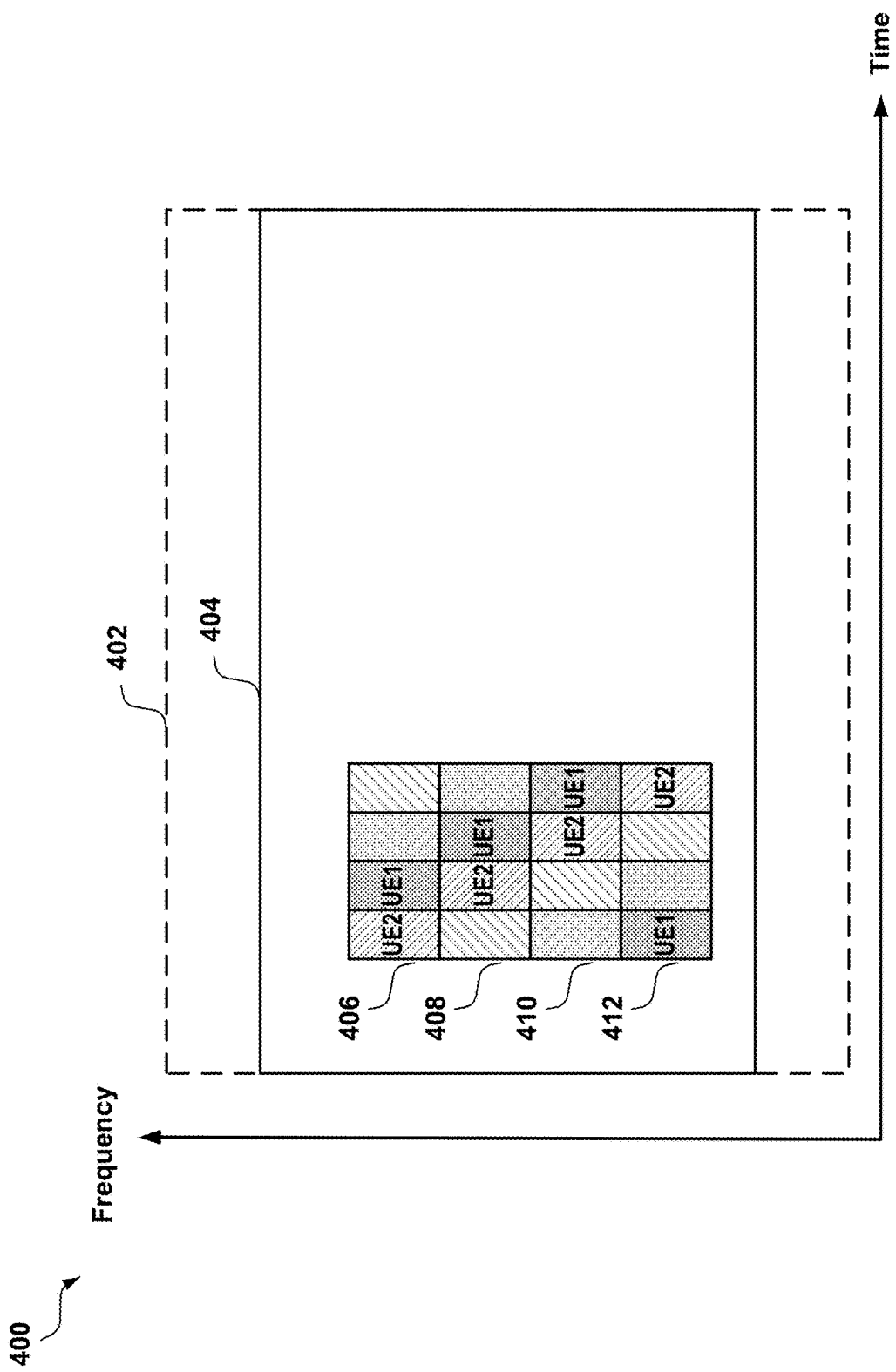
FIG. 4 is an illustration of a SRS hopping pattern in an UL signal, according to one or more of the presently described aspects.

Referring to FIG. 4, in an aspect, a multi-symbol SRS scheme 400 is shown with hopping, and an SRS hopping pattern may be used in UL resources 402 that includes a long resources allocation 404 for PUSCH and/or PUCCH transmissions of a UE (e.g., UE1 as shown in FIG. 4, or UE 12 or UE 14 in FIG. 1). Similar to the multi-symbol SRS scheme 300, for example, the long resources allocation 404 may include multiple symbols (e.g., OFDM symbols) in time domain, and multiple sub-bands (e.g., in resource blocks) in frequency domain. In an example, each block (e.g., blocks 406, 408, 410, and 412) represents a resource allocation for a respective UE (e.g., UE1 or UE2, or UE 12 or UE 14 in FIG. 1), and the UE may use the allocated or scheduled sub-bands and/or OFDM symbols to transmit one or more SRSs. In some examples, an SRS hopping may be performed in time domain (e.g., hopping from an OFDM symbol to a different OFDM symbol), and/or in frequency domain (e.g., hopping from an OFDM sub-band to a different OFDM sub-band).

In some aspects, UE1 may transmit PUSCH or PUCCH when UE1 is not transmitting SRS and/or when other UEs are scheduled to transmit SRS. In an aspect, the long resources allocation 404 shows that SRS transmissions (e.g., in one or more of the blocks 406, 408, 410, and 412) may be essentially punctured inside the PUSCH/PUCCH scheduled transmission(s) for the UE. In some implementations, SRS resources are semi-statically scheduled (e.g., by a network or the network entity 20) and one or more UEs (e.g., UE1, UE2, UE 12, and/or UE 14, or all the UEs in the coverage area of a cell) are aware of the SRS resources. In an example, the network or a network entity (e.g., the network entity 20) may dynamically switch the SRS resources ON and/or OFF.

Figure 5:
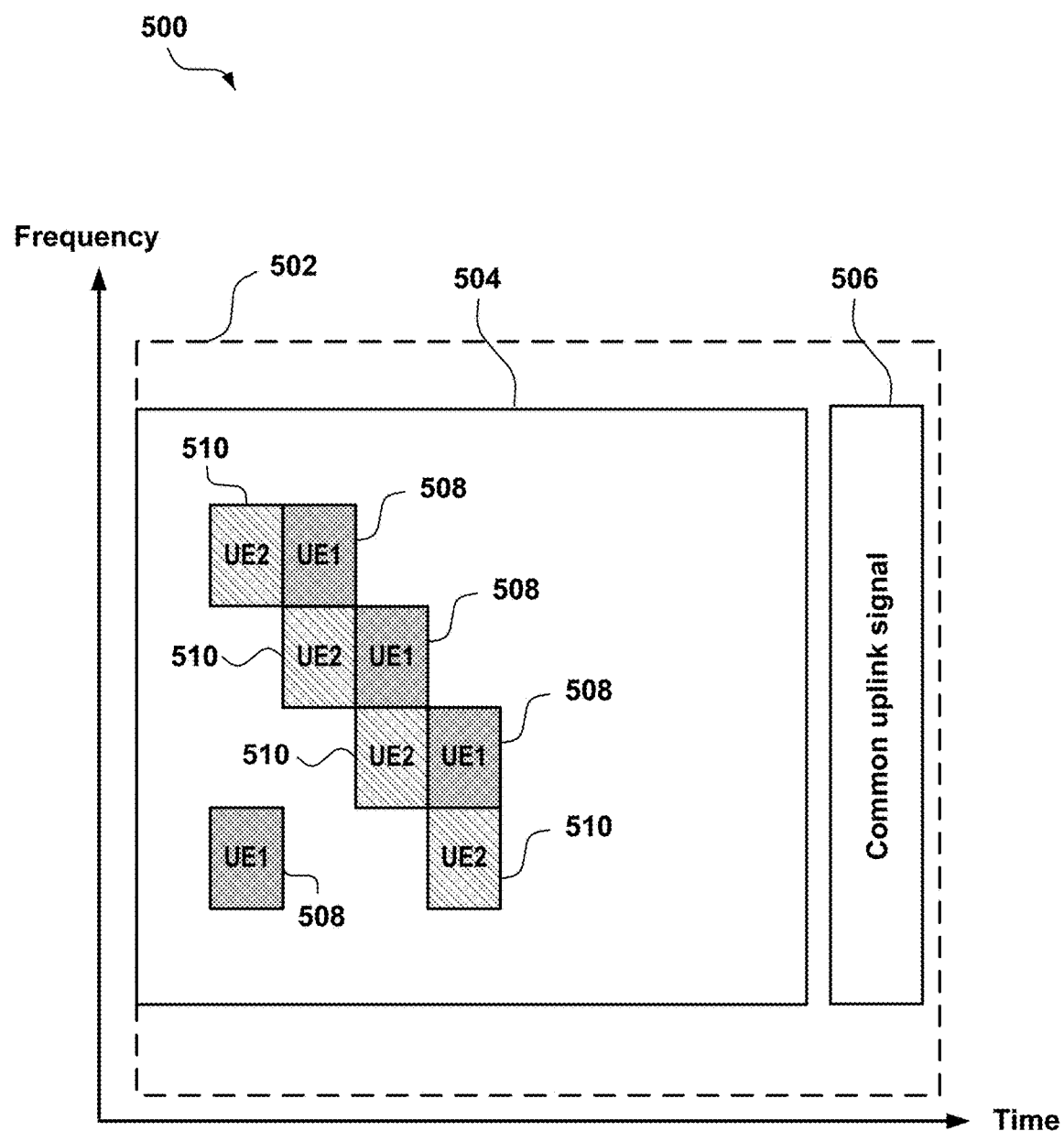
FIG. 5 is an illustration of example resources allocation for an SRS hopping in a long UL signal that is followed by a common UL signal, according to one or more of the presently described aspects.

Referring to FIG. 5, in an aspect, a UE (e.g., UE1, UE2, UE 12, or UE 14) may be configured to use a multi-symbol SRS scheme 500 to avoid a multi-cluster UL transmission in UL resources 502. In an implementation, a configuration may be included in or indicated by a UE capability to avoid a multi-cluster UL transmission. For example, in UL resources 502, after the UE learns which SRS resources (e.g., at blocks 508 and 510) are switched on (e.g., 2 resources out of 4, compared with the multi-symbol SRS scheme 300 in FIG. 3 and the multi-symbol SRS scheme 400 in FIG. 4), one or more different behaviors may be expected or configured by the UE. In an aspect, the UE may transmit an UL signal (e.g., a PUSCH or a PUCCH) in either way or in any condition, to avoid a multi-cluster transmission. For example, the UE (e.g., UE1) may notify (e.g., send a message/indication) the network or the network entity 20 dynamically that the UE has transmitted in a long UL (e.g., PUSCH/PUCCH) signal 504, even though these resources were allocated/scheduled for SRS transmissions of some other UEs (e.g., UE2), as shown in FIG. 5.

In an example, a notification may be included or transmitted in a common uplink signal 506 (e.g., a common uplink burst), which is in the same slot of the long UL signal 504. In this example, even though another UE (e.g., UE2) is scheduled to transmit (e.g., in blocks 510 with UE2 indicated), the UE (e.g., UE1) may still transmit the UL signal (e.g., a PUSCH or a PUCCH). In an example, the notification may indicate that the UE (e.g., UE1) transmits or has transmitted in resources that were used by SRS transmissions of another UE (e.g., UE2). In some implementations, the notification or indication may be sub-band specific or symbol specific. For example, the UE (e.g., UE1) may notify or indicate (e.g., to the network entity 20) that the UE has transmitted in a specific symbol and collided with one or more SRS transmissions from one or more other UEs (e.g., UE2).

In an aspect, when the UE (e.g., UE1) transmits the UL signal using DFT-S-OFDM, the UE may always transmit the UL signal (e.g., a PUSCH) to avoid multi-cluster UL transmissions. In some example, the network entity 20 may perform advance processing based on the notification, and/or based on the UE behavior discussed herein. In another example, the UE (e.g., UE1) may perform rate matching a PUSCH and/or a PUCCH, and does not transmit in the resources that were assigned to other UEs. In this case, the UE (e.g., UE1) does not avoid multi-cluster transmissions. For example, to avoid collisions with SRS transmissions from other UEs, the UE (e.g., UE1) may be silent in one or more particular sub-bands or clusters and do not transmit the UL signal(s) (e.g., a PUSCH), when one or more other UEs (e.g., UE2) are transmitting SRS.

Figure 6:
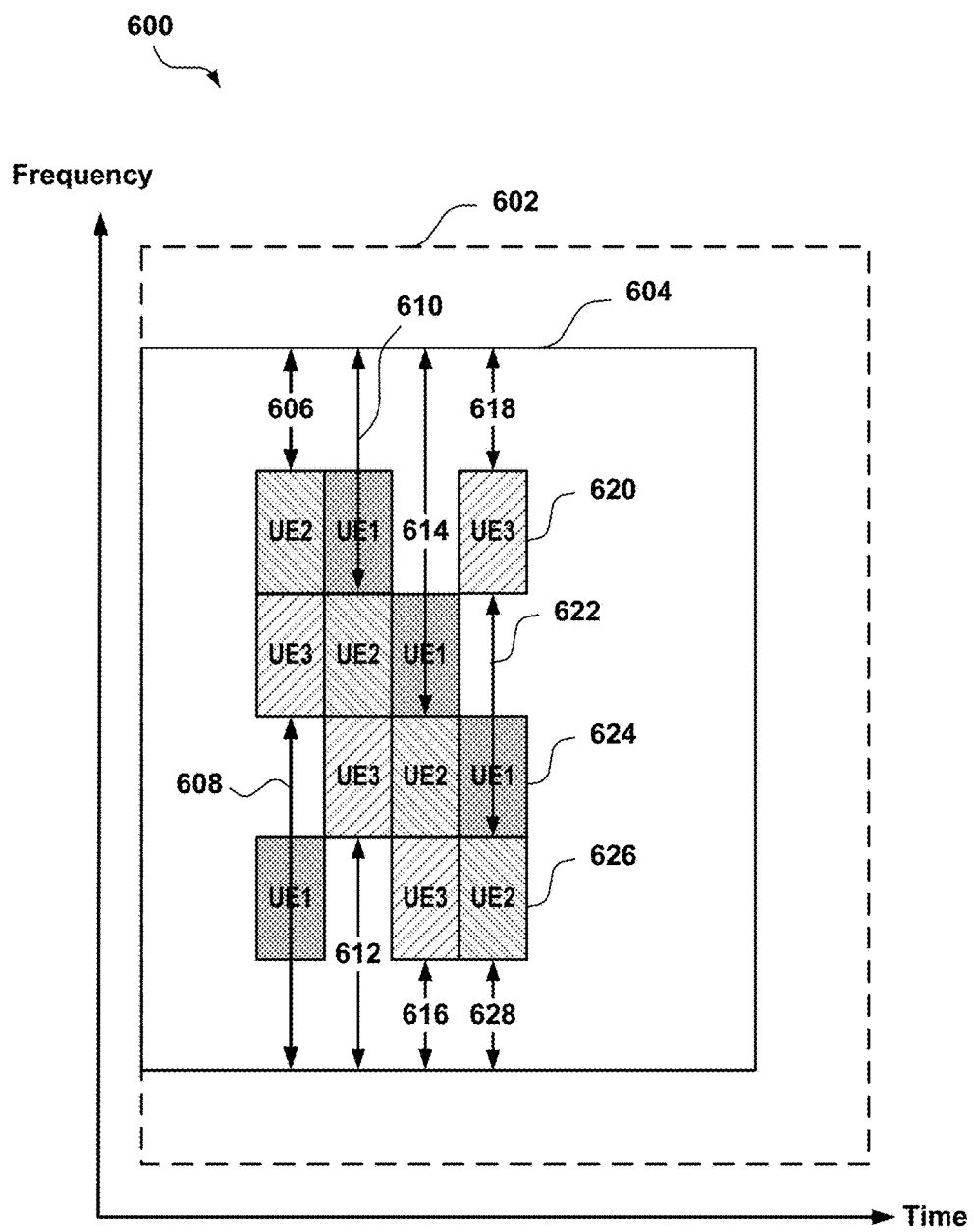
FIG. 6 is an illustration of example resources allocation for an SRS hopping and potential clusters selections for UL transmissions of a UE, according to one or more of the presently described aspects.

Referring to FIG. 6, in an aspect, a UE (e.g., e.g., UE1 and UE2, or the UE 12/14) may be configured to use a multi-cluster UL transmission scheme 600, for example, to avoid one or more multi-cluster UL transmissions or decrease the number of clusters to be used for UL transmissions. In an example shown in a resources allocation 604 within an UL resource 602, the UE (e.g., UE1) reports the maximum number (e.g., the maximum number X) of clusters the UE can support. In an implementation, the maximum number of clusters the UE can support may be part of or included in the UE capability. In an aspect, whenever the PUSCH/PUCCH assignment(s) and the active SRS resources lead to more than the maximum number X of clusters, the UE may transmit the UL signal(s) in a way that the number of clusters is decreased (e.g., decreased to a value that equals to or is less than the maximum number X). In an example, a symbol may have two clusters for UE1 to transmit UL signals. For instance, cluster 606 and cluster 608 may be used for UE1 to transmit a first symbol, cluster 610 and cluster 612 may be used for UE1 to transmit a second symbol, and cluster 614 and cluster 616 may be used for UE1 to transmit a third symbol.

In the example of the resources allocation 604, due to transmissions (e.g., SRS transmissions) from other UEs such as UE3 and UE2, UE1 may transmit in three (3) clusters in some of the symbols. For example, UE1 may transmit in clusters 618, 622, and 628 in the fourth symbol, while blocks 620, 624, and 626 use SRS resources to transmit SRS signals. In an aspect, for example, assuming the UE may only transmit in 2 clusters (e.g., X=2, and/or based on UE capability), for the symbols (shown in column) that there are more than 2 clusters (e.g., more than 2 vertical arrows), the UE1 may disregard either a pre-configured or a pseudo-random SRS transmission to ensure that only 2 clusters are being used for UE1 to transmit UL signals.

In some examples, the number of clusters that a UE can support may be different depending on the type of UL signal the UE transmits. For example, when the UE transmits a CP-OFDM signal, the maximum number of clusters that the UE can support may be different from the maximum number of clusters when the UE transmits a DFT-S-OFDM signal. In some implementations, two numbers, $X_1$ and $X_2$, may be used to indicate the maximum number of clusters that the UE can support, depends on the type of UL signal the UE transmits. For example, the number $X_1$ may indicate the maximum number of clusters that the UE can support when transmitting a CP-OFDM signal, and the number $X_2$ may indicate the maximum number of clusters that the UE can support when transmitting a DFT-S-OFDM signal. In an aspect, for example, for a CP-OFDM signal, the number $X_1$ may be configured to be larger than zero (e.g., $X_1>0$), and for a DFT-S-OFDM signal, the number $X_2$ may be configured to be equal to zero (e.g., $X_2=0$). In an aspect, the UE may have a different behavior based on the type of UL signal the UE has transmitted or is transmitting, as discussed herein.

Figure 7:
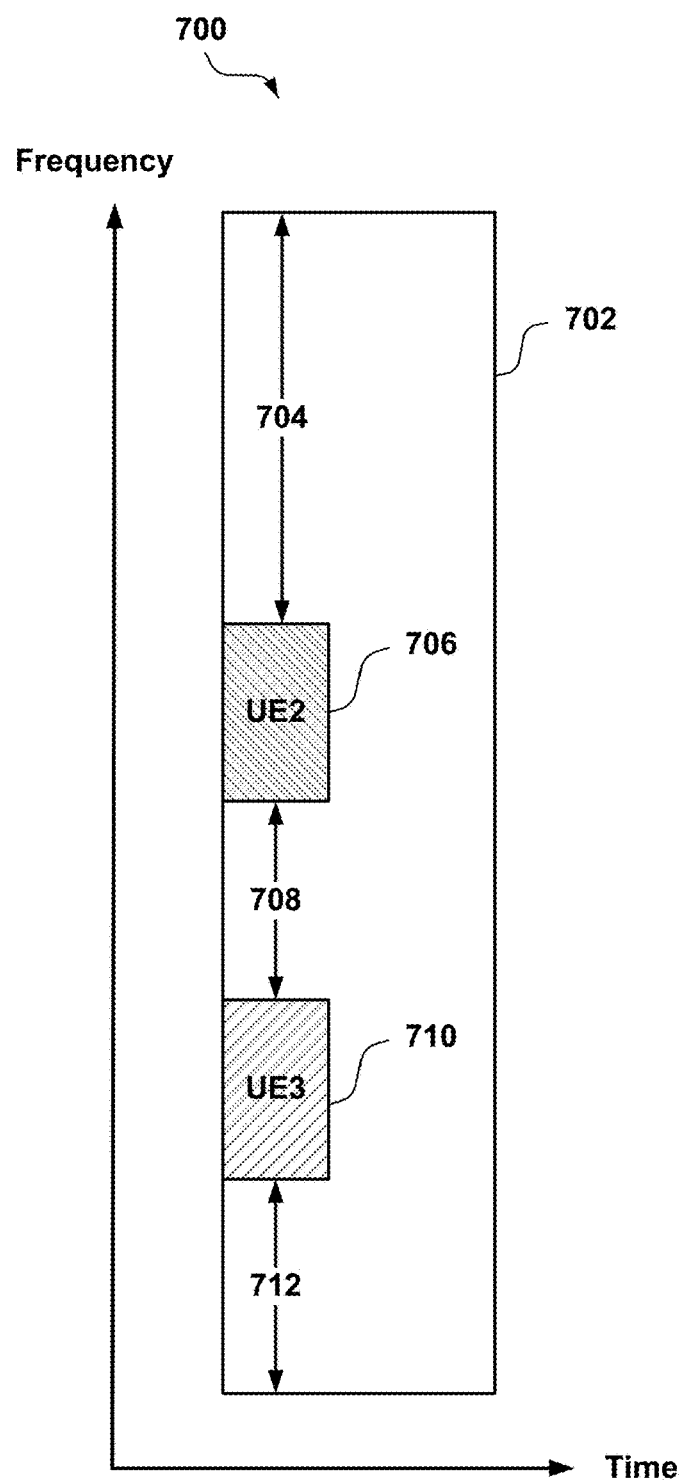
FIG. 7 is an illustration of example resources allocation for selecting potential clusters for UL transmissions of a UE, according to one or more of the presently described aspects.

Referring to FIG. 7, in an aspect, a UE (e.g., UE1, or the UE 12/14) may use a multi-cluster UL transmission scheme 700 to decrease the number of transmitted clusters or clusters to be used for UL transmissions. In this example, a resources allocation 702 may include 3 clusters (e.g., clusters 704, 708, and 712) for UE1 to transmit UL signals. In one implementation, the UE1 may disregard the SRS transmission(s) from either the UE2 (e.g., block 706) or the UE3 (e.g., block 710), and may transmit UL signal(s) (e.g., PUSCH/PUCCH) in 2 clusters instead of 3 clusters, so that the number of clusters are reduced from 3 to 2. In some implementations, the choice of which one out of the multiple clusters being disregarded may be configured based on a predetermined rule. For example, the UE may disregard one or more clusters that is/are at first, counting from one direction (e.g., from a higher frequency to a lower frequency, or from a lower frequency to a higher frequency). In another example, the UE may disregard one or more clusters using a pseudo-random method (e.g., seed depends on an SRS index identification (ID), and/or a symbol ID).

Figure 8:
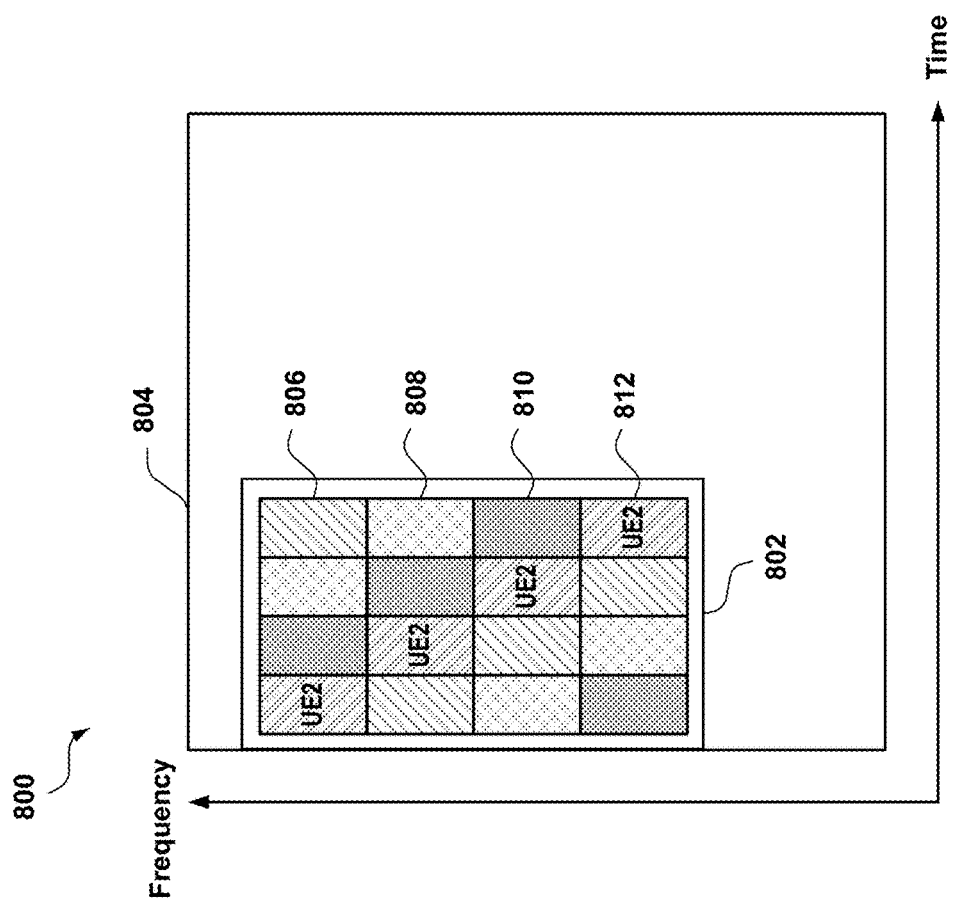
FIG. 8 is an illustration of example resources allocation with rate matching at a UE, according to one or more of the presently described aspects.

Referring to FIG. 8, in an aspect, a UE (e.g., UE1, or the UE 12/14) may use a multi-cluster UL transmission scheme 800 to perform rate matching when the UE is configured to transmit UL signals (e.g., PUSCH). In a resources allocation 804, SRS transmissions (e.g., in one or more of the blocks 806, 808, 810, and 812) may be essentially punctured inside the PUSCH/PUCCH scheduled transmission(s) for the UE.

In some examples, the rate matching may be simplified. For example, in the resources allocation 804, the UE (e.g., UE1) may rate matches a rate matching box 802 (a two-dimension box) around all the configured or allocated resources 804 (e.g., SRS resources or transmissions from other UEs). In some aspects, the UE may be configured to dynamically perform a rate matching. In an example, the UE may be configured in a default mode (e.g., the UE transmits conservatively) to ensure that the UE does not interfere with SRS transmissions from any other UEs. When the UE does not receive expected downlink control information (DCI), or fails to decode the received DCI, or fails to identify which resources are switched on (e.g., based on the DCI), the UE may be configured to perform in the default mode. In another example, when the UE does not receive the expected DCI, fails to decode the received DCI, and/or fails to identify which resources are switched on, the UE may be configured to perform a rate matching (e.g., the rate matching box 802) around all the SRS resources/transmissions from any other UEs. In some example, when the UE receives the DCI, successfully decodes the received DCI, and/or successfully identifies which resources are switched on, the UE may be configured to perform a rate matching the rate matching box 802, around all the configured SRS resources of other UEs. In some implementations, the UE does not need to identify which resources (e.g., SRS transmissions from other UEs) are switched on, and the UE may be dynamically configured to a default mode (e.g., to perform or not to perform a rate matching), or perform a rate matching if supported by the UE.

In some examples, the network entity 20 may indicate semi-statically to the UE whether the network entity 20 wants the UE to perform a conservative rate matching as described herein. For example, the UE may be configured or indicated (e.g., by the network entity 20) to perform rate matching around all SRS resources. In another example, the UE may perform rate matching around all SRS resources that are configured semi-statically and/or independently if a rate matching is not triggered through a DCI in the same slot. In another example, the UE may be configured or indicated (e.g., by the network entity 20) to perform rate matching around all SRS resources. In an aspect, if the UE is configured with a hopping SRS resource, then the UE may rate match and/or be silent (e.g., no UL transmissions) in all the sub-bands and symbols that may be used in the hopping pattern by other UEs (e.g., UE2 or UE3).

In some aspects, one or more notifications or indications associated with SRS patterns (e.g., the rate matching box 802 in FIG. 8) may be transmitted to the UE. In an example, for CP-OFDM based PUSCH transmissions, a few SRS patterns (or equivalently PUSCH rate matching patterns for SRS) may be defined in a cell-specific and/or a UE-specific manner. In an aspect, a cell-specific indication may indicate some fixed or semi-static SRS transmissions. For example, for periodic SRS transmissions, a cell-specific indication may indicate that the SRS may only use the first symbol or the last symbol of the UL portion of a UL-centric slot. In another aspect, a UE-specific indication may be used based on two or more radio resource control (RRC) configured SRS patterns. For example, for aperiodic SRS transmissions or some periodic SRS transmissions, one or more SRS patterns discussed herein may be used. In some cases, a first pattern may be one or more SRSs in an entire narrowband, where the narrowband location is slot-dependent. In some other cases, a second pattern may be one or more SRSs in an entire narrowband, where the narrowband location is symbol-dependent. In some examples, a third pattern may be a wideband SRS, in a set of symbols in a slot. In some implementations, at least one of the first pattern, the second pattern, or the third pattern may be used for aperiodic SRS transmissions or periodic SRS transmissions.

In an aspect, the UE may combine one or more cell-specific indications (e.g., an indication of cell-specific SRS patterns) and one or more UE-specific indications (e.g., an indication of UE-specific SRS patterns) to derive one or more rate matching parameters. For example, one or more PUSCH rate match parameters may be configured depending on a combination of cell-specific SRS pattern(s) and UE-specific SRS pattern(s). In some implementations, the network entity 20 may be configured to identify and/or manage whether or not there are SRS transmissions in a first cell that collide with a PUSCH transmission in a second cell.

In some aspects, for single-carrier OFDM (SC-OFDM) based PUSCH, the SRS patterns may be defined on a per symbol basis (e.g., symbol-by-symbol, or on sub-band specific processing). In some examples, assuming SC-OFDM based PUSCH may be assigned with two or more sub-bands, if a SC-OFDM based PUSCH transmission is restricted to assignments or an allocation within one sub-band, the SRS patterns for SC-OFDM based PUSCH rate matching may be done on a per sub-band basis. For example, a first set of patterns may be used for a first sub-band, and a second set of patterns may be used for a second sub-band, etc. In some implementations, the UE, when assigned PUSCH within a sub-band, may use an indicated pattern that corresponds to the assigned sub-band.

In an aspect, in case of a PUSCH transmission without a DCI, there may be a default or semi-static configuration or rate matching, in case a dynamic approach discussed herein may be not easily available.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 9:
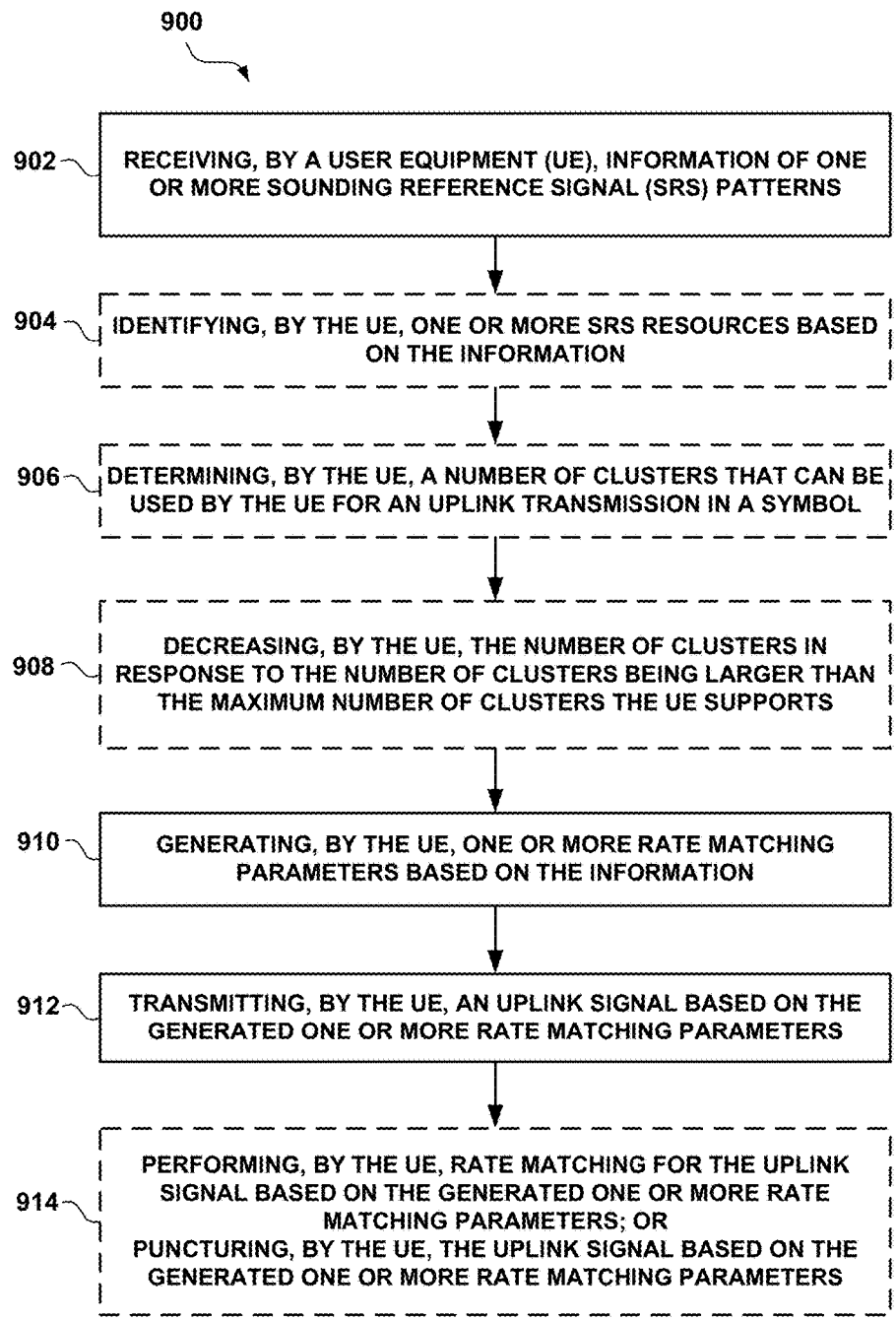
FIG. 9 is a flow diagram of a first example method for uplink transmissions, according to one or more of the presently described aspects.

Referring to FIG. 9, in an operational aspect, a UE (e.g., UE1, or UE 12 or UE 14) may perform one or more aspects of a method 900 for uplink transmissions in a wireless communications system. For example, one or more of the processors 103, the memory 130, the modem 108, the transceiver 106 (e.g., the receiver 32 and/or transmitter 34), the uplink management component 40, the SRS resources component 42, the rate matching component 44, and/or the cluster management component 46, may be configured to perform one or more aspects of the method 900.

In an aspect, at block 902, the method 900 may include receiving, by a UE, information of one or more SRS patterns. In an aspect, for example, the uplink management component 40 and/or the SRS resources component 42, e.g., in conjunction with one or more of the processors 103, the memory 130, the modem 108, and/or the receiver 32, may be configured to receive, via the receiver 32, information of one or more SRS patterns. In some examples, the UE may receive the information of one or more SRS patterns through one or more indications from the network entity 20. In some cases, the information of the one or more SRS patterns may be received in DCI or on a physical downlink control channel (PDCCH).

In an aspect, at block 904, the method 900 may optionally include identifying, by the UE, one or more SRS resources based on the information. In an aspect, for example, the uplink management component 40 and/or the SRS resources component 42, e.g., in conjunction with one or more of the processors 103, the memory 130, the modem 108, and/or the transceiver 106, may be configured to identify or determine one or more SRS resources based on the information received at block 902. In an example, the UE may transmit, via the transceiver 106, one or more uplink signals around the identified one or more SRS resources. In some cases, the one or more SRS patterns may indicate one or more SRS resources used or scheduled for uplink transmissions.

In an aspect, at block 906, the method 900 may optionally include determining, by the UE, a number of clusters that can be used by the UE for an uplink transmission in a symbol. In an aspect, for example, the uplink management component 40 and/or the cluster management component 46, e.g., in conjunction with one or more of the processors 103, the memory 130, the modem 108, and/or the transceiver 106, may be configured to determine the number of clusters that can be used by the UE for an uplink transmission in a symbol. In an example, the UE may determine, identify, or report the maximum number of clusters the UE can support, and the maximum number of clusters may be part of or included in the UE capability of the UE. In some cases, the clusters may be non-contiguous clusters in the frequency domain that can be used by the UE for one or more uplink transmissions, and the symbol may be an OFDM symbol.

In an aspect, at block 908, the method 900 may optionally include decreasing, by the UE, the number of clusters in response to the number of clusters being larger than the maximum number of clusters the UE supports. In an aspect, for example, the uplink management component 40 and/or the cluster management component 46, e.g., in conjunction with one or more of the processors 103, the memory 130, the modem 108, and/or the transceiver 106, may be configured to decrease the number of clusters used by the UE for uplink transmissions in response to the determined number of clusters at block 906 being larger than the maximum number of clusters the UE supports. For example, the UE may be configured to drop one or multiple of the clusters.

In an aspect, at block 910, the method 900 may include generating, by the UE, one or more rate matching parameters based on the information. In an aspect, for example, the uplink management component 40 and/or the rate matching component 44, e.g., in conjunction with one or more of the processors 103, the memory 130, the modem 108, and/or the transceiver 106, may be configured to generate (e.g., perform identifying, determining, and/or calculating) one or more rate matching parameters based on the one or more indications and/or the information of the one or more SRS patterns received at block 902. In some examples, the information may be SRS patterns or rate matching parameters that are received in DCI or on a PDCCH.

In an aspect, at block 912, the method 900 may include transmitting, by the UE, an uplink signal based on the generated one or more rate matching parameters. In an aspect, for example, the uplink management component 40 and/or the rate matching component 44, e.g., in conjunction with one or more of the processors 103, the memory 130, the modem 108, and/or the transmitter 34, may be configured to transmit, via the transmitter 34, one or more uplink signals (e.g., PUSCH/PUCCH) based on the one or more rate matching parameters generated at block 910.

In an aspect, at block 914, the method 900 may optionally include performing, by the UE, rate matching for the uplink signal based on the generated one or more rate matching parameters. In an aspect, for example, the uplink management component 40 and/or the rate matching component 44, e.g., in conjunction with one or more of the processors 103, the memory 130, the modem 108, and/or the transceiver 106, may be configured to perform rate matching for the uplink signal based on the generated one or more rate matching parameters. For example, the UE may be configure to perform the rate matching around the identified SRS resources at block 904.

Alternatively, at block 914, the method 900 may optionally include puncturing, by the UE, the uplink signal based on the generated one or more rate matching parameters. In an aspect, for example, the uplink management component 40 and/or the rate matching component 44, e.g., in conjunction with one or more of the processors 103, the memory 130, the modem 108, and/or the transceiver 106, may be configured to puncture the uplink signal based on the one or more rate matching parameters generated at block 910.

Figure 10:
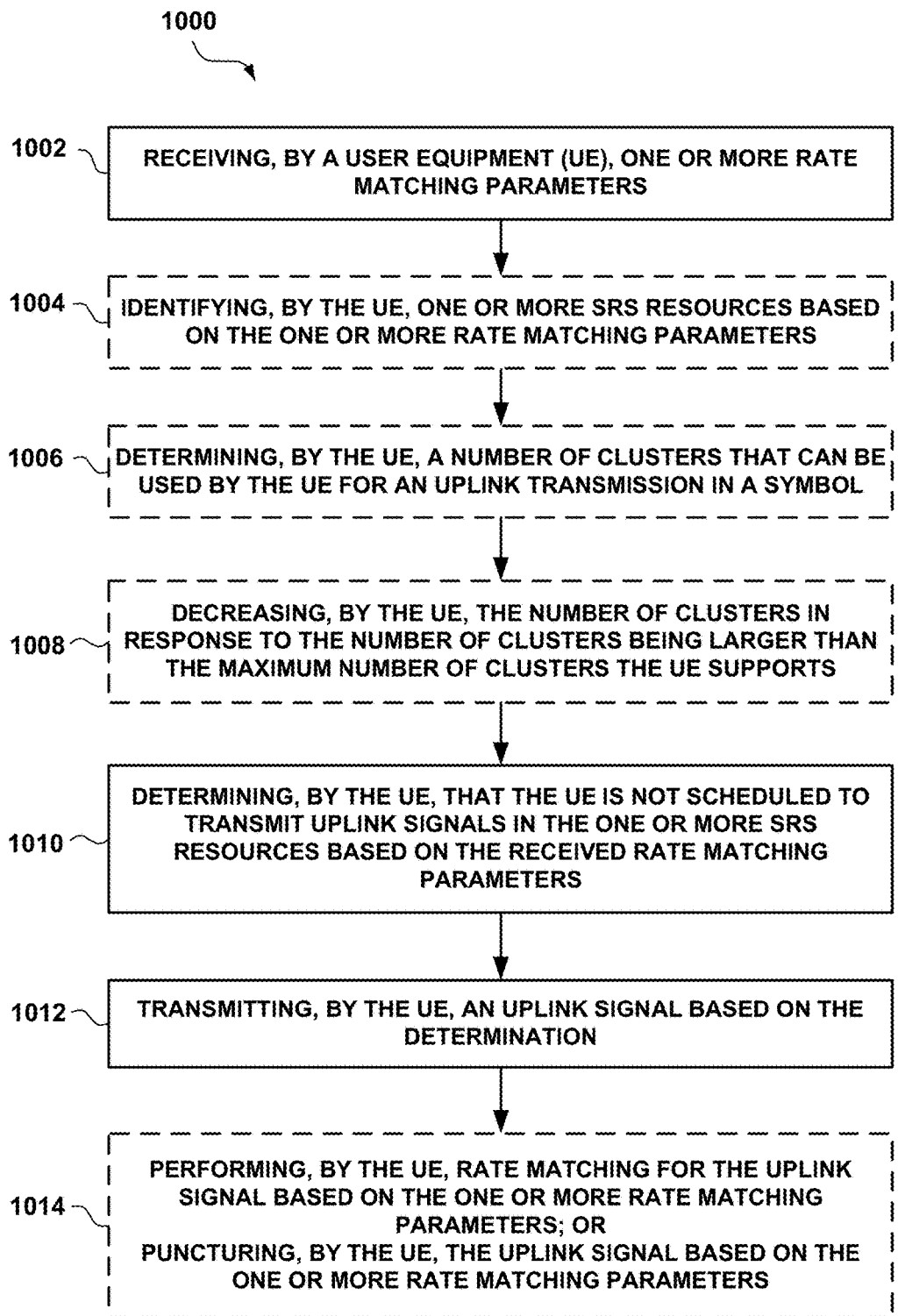
FIG. 10 is a flow diagram of a second example method for uplink transmissions, according to one or more of the presently described aspects

Referring to FIG. 10, in another operational aspect, a UE (e.g., UE1, or UE 12 or UE 14) may perform one or more aspects of a method 1000 for uplink transmissions in a wireless communications system. For example, one or more of the processors 103, the memory 130, modem 108, transceiver 106 (e.g., the receiver 32 and/or transmitter 34), the uplink management component 40, SRS resources component 42, rate matching component 44, and/or the cluster management component 46, may be configured to perform one or more aspects of the method 1000.

In an aspect, at block 1002, the method 1000 may include receiving, by a UE, one or more rate matching parameters. In an aspect, for example, the uplink management component 40, and/or rate matching component 44, e.g., in conjunction with one or more of the processors 103, the memory 130, the modem 108, and/or the receiver 32, may be configured to receive, via the receiver 32, one or more rate matching parameters. In some examples, the UE may receive the one or more rate matching parameters (e.g., parameters associated with one or more SRS patterns or SRS resources) from the network entity 20.

In an aspect, at block 1004, the method 1000 may optionally include identifying, by the UE, one or more SRS resources based on the one or more rate matching parameters. In an aspect, for example, the uplink management component 40, SRS resources component 42, and/or rate matching component 44, e.g., in conjunction with one or more of the processors 103, the memory 130, the modem 108, and/or the transceiver 106, may be configured to identify or determine one or more SRS resources based on the one or more rate matching parameters received at block 1002. In an example, the UE may transmit, via the transceiver 106, one or more uplink signals around the identified one or more SRS resources.

In an aspect, at block 1006, the method 1000 may optionally include determining, by the UE, a number of clusters that can be used by the UE for an uplink transmission in a symbol. In an aspect, for example, the uplink management component 40 and/or the cluster management component 46, e.g., in conjunction with one or more of the processors 103, the memory 130, the modem 108, and/or the transceiver 106, may be configured to may be configured to determine the number of clusters that can be used by the UE for an uplink transmission in a symbol. In an example, the UE may determine, identify, or report the maximum number of clusters the UE can support, and the maximum number of clusters may be part of or included in the UE capability of the UE. In some cases, the clusters may be non-contiguous clusters in the frequency domain that can be used by the UE for one or more uplink transmissions, and the symbol may be an OFDM symbol.

In an aspect, at block 1008, the method 1000 may optionally include decreasing, by the UE, the number of clusters in response to the number of clusters being larger than the maximum number of clusters the UE supports. In an aspect, for example, the uplink management component 40 and/or the cluster management component 46, e.g., in conjunction with one or more of the processors 103, the memory 130, the modem 108, and/or the transceiver 106, may be configured to decrease the number of clusters used by the UE for an uplink transmission in response to the determined number of clusters at block 1006 being larger than the maximum number of clusters the UE supports. For example, the UE may be configured to drop one or multiple of the clusters.

In an aspect, at block 1010, the method 1000 may include determining, by the UE, that the UE is not scheduled to transmit uplink signals in one or more SRS resources based on the received one or more rate matching parameters. In an aspect, for example, the uplink management component 40 and/or the rate matching component 44, e.g., in conjunction with one or more of the processors 103, the memory 130, the modem 108, and/or the transceiver 106, may be configured to determine whether or not the UE is scheduled to transmit uplink signals in one or more SRS resources based on the one or more rate matching parameters received at block 1002. In some examples, the one or more rate matching parameters may be associated with one or more indications and/or information of the one or more SRS patterns. In some cases, the one or more rate matching parameters may include one or more SRS patterns that indicate the one or more SRS resources.

In an aspect, at block 1012, the method 1000 may include transmitting, by the UE, an uplink signal based on the determination. In an aspect, for example, the uplink management component 40 and/or the rate matching component 44, e.g., in conjunction with one or more of the processors 103, the memory 130, the modem 108, and/or the transmitter 34, may be configured to transmit, via the transmitter 34, one or more uplink signals (e.g., PUSCH/PUCCH) based on the determination at block 1010. For example, the UE may transmit, via the transmitter 34, one or more uplink signals around the one or more SRS resources identified at block 1004.

In an aspect, at block 1014, the method 1000 may optionally include performing, by the UE, rate matching for the uplink signal based on the one or more rate matching parameters. In an aspect, for example, the uplink management component 40 and/or the rate matching component 44, e.g., in conjunction with one or more of the processors 103, the memory 130, the modem 108, and/or the transceiver 106, may be configured to perform rate matching for the uplink signal based on the one or more rate matching parameters. For example, the UE may be configure to perform the rate matching around the identified SRS resources at block 1004.

Alternatively, at block 1014, the method 1000 may optionally include puncturing, by the UE, the uplink signal based on the one or more rate matching parameters. In an aspect, for example, the uplink management component 40 and/or the rate matching component 44, e.g., in conjunction with one or more of the processors 103, the memory 130, the modem 108, and/or the transceiver 106, may be configured to puncture the uplink signal based on the one or more rate matching parameters received at block 1002.

Several aspects of a telecommunications system have been presented with reference to an LTE/LTE-A or a 5G communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications, comprising:
   receiving, by a user equipment (UE) from a network entity, information of one or more sounding reference signal (SRS) patterns;
   generating, by the UE, one or more rate matching parameters based on the information;
   identifying, by the UE, one or more SRS resources based on the information; and
   transmitting, by the UE, an uplink signal based on the generated one or more rate matching parameters,
   wherein the uplink signal is transmitted in the identified one or more SRS resources and the uplink signal is a Physical Uplink Shared Channel (PUSCH) signal or a Physical Uplink Control Channel (PUCCH) signal.

2. The method of claim 1, wherein the identified one or more SRS resources are configured semi-statically or independently.

3. The method of claim 1, further comprising:
   performing, by the UE, rate matching for the uplink signal based on the generated one or more rate matching parameters.

4. The method of claim 1, further comprising:
   puncturing, by the UE, the uplink signal based on the generated one or more rate matching parameters.

5. The method of claim 1, wherein the uplink signal is a long PUCCH channel, or a short PUCCH channel, or a PUSCH channel with a duration from one to fourteen symbols.

6. The method of claim 1, further comprising:
   determining, by the UE, a number of clusters that can be used by the UE for an uplink transmission in a symbol; and
   decreasing, by the UE, the number of clusters in response to the number of clusters being larger than the maximum number of clusters the UE supports.

7. The method of claim 6, wherein the clusters are non-contiguous clusters in frequency domain that can be used by the UE for the uplink transmission, and wherein the symbol is an orthogonal frequency division multiplexing (OFDM) symbol.

8. The method of claim 6, wherein the decreasing the number of clusters comprises dropping one or multiple of the clusters.

9. The method of claim 1, further comprising:
determining, by the UE, whether the uplink signal is an orthogonal frequency division multiplexing with cyclic prefix (CP-OFDM) signal or a discrete Fourier transform spread OFDM (DFT-S-OFDM) signal; and
determining, by the UE, a number of clusters that can be used by the UE for uplink transmissions based on the determination of the uplink signal being a CP-OFDM signal or a DFT-S-OFDM signal, wherein the number of clusters is different for the uplink signal being a CP-OFDM signal or a DFT-S-OFDM signal.

10. The method of claim 1, wherein the one or more SRS patterns include at least a cell-specific SRS pattern or a UE-specific SRS pattern, and wherein the one or more rate matching parameters are generated based on at least the cell-specific SRS pattern or the UE-specific SRS pattern.

11. The method of claim 1, wherein the uplink signal is transmitted when at least one other UE is scheduled to transmit SRS.

12. The method of claim 11, wherein the uplink signal includes a notification indicating that the UE transmitted in resources that were used by SRS transmissions of another UE.

13. A method of wireless communications, comprising:
receiving, by a user equipment (UE) from a network entity, one or more rate matching parameters;
determining, by the UE, that the UE is not scheduled to transmit uplink signals in one or more sounding reference signal (SRS) resources based on the received one or more rate matching parameters;
identifying, by the UE, the one or more SRS resources based on the one or more rate matching parameters; and
transmitting, by the UE, an uplink signal based on the determination,
wherein the uplink signal is transmitted in the identified one or more SRS resources and the uplink signal is a Physical Uplink Shared Channel (PUSCH) signal or a Physical Uplink Control Channel (PUCCH) signal.

14. The method of claim 13, wherein the one or more rate matching parameters includes one or more SRS patterns indicating the one or more SRS resources.

15. The method of claim 13, further comprising:
performing, by the UE, rate matching for the uplink signal based on the one or more rate matching parameters.

16. The method of claim 13, further comprising:
puncturing, by the UE, the uplink signal based on the one or more rate matching parameters.

17. The method of claim 13, wherein the uplink signal is transmitted when at least one other UE is scheduled to transmit SRS.

18. The method of claim 17, wherein the uplink signal includes a notification indicating that the UE transmitted in resources that were used by SRS transmissions of another UE.

19. An apparatus for wireless communications, comprising:
a receiver configured to receive signals;
a transmitter configured to transmit signals;
a memory configured to store instructions; and
at least one processor communicatively coupled with the receiver, the transmitter, and the memory, wherein the at least one processor is configured to execute the instructions to:
receive, from a network entity via the receiver, information of one or more sounding reference signal (SRS) patterns;
generate one or more rate matching parameters based on the information;
identify one or more SRS resources based on the information; and
transmit, via the transmitter, an uplink signal based on the generated one or more rate matching parameters,
wherein the uplink signal is transmitted in the identified one or more SRS resources and the uplink signal is a Physical Uplink Shared Channel (PUSCH) signal or a Physical Uplink Control Channel (PUCCH) signal.

20. The apparatus of claim 19, wherein the at least one processor is configured to execute further instructions to:
perform rate matching for the uplink signal based on the generated one or more rate matching parameters.

21. The apparatus of claim 19, wherein the at least one processor is configured to execute further instructions to:
puncture the uplink signal based on the generated one or more rate matching parameters.

22. The apparatus of claim 19, wherein the at least one processor is configured to execute further instructions to:
determine a number of clusters that can be used by the apparatus for an uplink transmission in a symbol; and
decrease the number of clusters in response to the number of clusters being larger than the maximum number of clusters the apparatus supports.

23. The apparatus of claim 19, wherein the uplink signal is transmitted when at least one other UE is scheduled to transmit SRS.

24. The apparatus of claim 23, wherein the uplink signal includes a notification indicating that the UE transmitted in resources that were used by SRS transmissions of another UE.

25. An apparatus for wireless communications, comprising:
a receiver configured to receive signals;
a transmitter configured to transmit signals;
a memory configured to store instructions; and
at least one processor communicatively coupled with the receiver, the transmitter, and the memory, wherein the at least one processor is configured to execute the instructions to:
receive, from a network entity via the receiver, one or more rate matching parameters;
determine that the apparatus is not scheduled to transmit uplink signals in one or more sounding reference signal (SRS) resources based on the received one or more rate matching parameters;
identify the one or more SRS resources based on the one or more rate matching parameters; and
transmit, via the transmitter, an uplink signal based on the determination,
wherein the uplink signal is transmitted in the identified one or more SRS resources and the uplink signal is a Physical Uplink Shared Channel (PUSCH) signal or a Physical Uplink Control Channel (PUCCH) signal.

26. The apparatus of claim 25, wherein the one or more rate matching parameters includes one or more SRS patterns that indicate the one or more SRS resources.

27. The apparatus of claim 25, wherein the at least one processor is configured to execute further instructions to:
perform rate matching for the uplink signal based on the one or more rate matching parameters.

28. The apparatus of claim 25, wherein the at least one processor is configured to execute further instructions to:
  puncture the uplink signal based on the one or more rate matching parameters.

29. The apparatus of claim 25, wherein the uplink signal is transmitted when at least one other UE is scheduled to transmit SRS.

30. The method of claim 29, wherein the uplink signal includes a notification indicating that the UE transmitted in resources that were used by SRS transmissions of another UE.

\* \* \* \* \*